(12) United States Patent
Peng et al.

(10) Patent No.: US 9,093,084 B2
(45) Date of Patent: Jul. 28, 2015

(54) FLEXIBLE BIASING STRATEGY FOR GROUND-SPLIT TCR SENSORS

(71) Applicant: Seagate Technology LLC, Cupertino, CA (US)

(72) Inventors: Peng Peng, Eden Prairie, MN (US); Zhen Wei, Maple Grove, MN (US); Declan Macken, Prior Lake, MN (US); Darreyl Sedbrook, Rosemount, MN (US); Muhammed Mujahid Khan, Chaska, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/099,035

(22) Filed: Dec. 6, 2013

(65) Prior Publication Data
US 2015/0162022 A1    Jun. 11, 2015

(51) Int. Cl.
*G11B 5/02* (2006.01)
*G11B 5/03* (2006.01)
*G11B 5/39* (2006.01)
*G11B 5/48* (2006.01)

(52) U.S. Cl.
CPC .. *G11B 5/03* (2013.01); *G11B 5/02* (2013.01); *G11B 5/3945* (2013.01); *G11B 5/4866* (2013.01)

(58) Field of Classification Search
CPC ...... G11B 5/3945; G11B 5/3961; G11B 5/56; G11B 5/58; G11B 5/581; G11B 5/60; G11B 5/6011; G11B 5/607; G11B 5/6076; G11B 5/4866
USPC ........... 360/59, 75, 66, 67, 234, 234.3, 77.03, 360/110
See application file for complete search history.

(56) References Cited

U.S. PATENT DOCUMENTS

| | | | |
|---|---|---|---|
| 6,426,495 B1 * | 7/2002 | Hayami et al. | 250/214 R |
| 7,097,110 B2 * | 8/2006 | Sheperek et al. | 236/1 C |
| 7,800,858 B1 | 9/2010 | Bajikar et al. | |
| 8,139,310 B1 * | 3/2012 | Hogg | 360/75 |
| 8,279,550 B1 | 10/2012 | Hogg | |
| 8,804,272 B1 * | 8/2014 | Dakroub et al. | 360/75 |
| 2008/0225426 A1 | 9/2008 | Roy et al. | |
| 2012/0120522 A1 | 5/2012 | Johnson et al. | |
| 2012/0120527 A1 * | 5/2012 | Kunkel et al. | 360/235.4 |
| 2012/0201108 A1 * | 8/2012 | Zheng et al. | 369/13.26 |
| 2013/0176643 A1 * | 7/2013 | Contreras et al. | 360/235.4 |
| 2014/0354308 A1 * | 12/2014 | Hong et al. | 324/713 |

* cited by examiner

*Primary Examiner* — Thomas Alunkal
(74) *Attorney, Agent, or Firm* — Hollingsworth Davis, LLC

(57) ABSTRACT

A first biasing potential is sent to a first input end of a first temperature coefficient of resistance (TCR) sensor having a first ground end coupled to a ground potential. A second biasing potential is sent to a second input end of a second TCR sensor having a second ground end coupled to the ground potential. The first and the second biasing potentials are changed to operate in a plurality of modes.

15 Claims, 10 Drawing Sheets

FLEXIBLE BIASING STRATEGY FOR GROUND-SPLIT TCR SENSORS

SUMMARY

Some embodiments involve a method that includes sending a first biasing potential to a first input end of a first temperature coefficient of resistance (TCR) sensor having a first ground end coupled to a ground potential. A second biasing potential is sent to a second input end of a second TCR sensor having a second ground end coupled to the ground potential. The first and the second biasing potentials are changed to operate in a plurality of modes.

According to some implementations, an apparatus comprises a head transducer that interacts with a recording medium. The head transducer comprises a first temperature coefficient of resistance (TCR) sensor having a first input end and a first ground end coupled to a ground potential, a second TCR sensor having a second input end and a second ground end coupled to the ground potential, and biasing circuitry coupled to the first and second input ends and configured to bias the first and second TCR sensors to operate in a plurality of modes.

Some embodiments involve a memory system, comprising a disk drive that includes a head transducer that interacts with a recording medium The head transducer comprises a first temperature coefficient of resistance (TCR) sensor having a first input end and a first ground end coupled to a ground potential, a second TCR sensor having a second input end and a second ground end coupled to the ground potential, and biasing circuitry coupled to the first and second input ends and configured to bias the first and second TCR sensors to operate in a plurality of modes.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Data storage systems commonly include one or more magnetic heads that read and write information to a recording medium. It is often desirable to have a relatively small distance or spacing between a recording head and its associated media. This distance or spacing is known as "fly height" or "head-media spacing." By reducing the head-media spacing, a magnetic head is typically better able to both write and read data to and from a medium. Reducing the head-media spacing also allows for surveying of recording medium topography, such as for detecting asperities and other features of the recording medium surface.

One or more sensors on the head may be included in a magnetic head and be used to detect contact and/or thermal asperities. The sensors may be used to reject thermal mode noise. According to various implementations, the sensors may be biased to operate in more than one mode. For example, the sensors may be biased to operate in a parallel mode, a pseudo series mode, and/or individual channel modes.

Figure 1A:
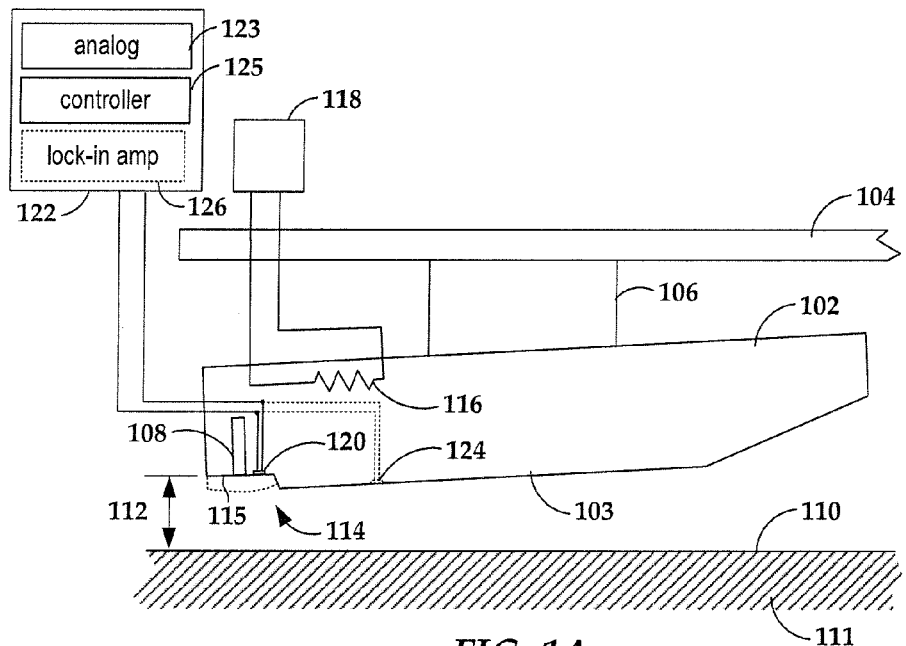
FIG. 1A is a block diagram showing a side view of a magnetic sensor employed in a hard drive slider according to embodiments described herein.

In reference now to FIG. 1A, a block diagram shows a side view of a magnetic sensor employed in a hard drive slider 102 according to an example embodiment. The slider 102 is coupled to an arm 104 by way of a suspension 106 that allows some relative motion between the slider 102 and arm 104. The slider 102 includes read/write transducers 108 at a media reading surface 115 near a trailing edge of the slider 102. The transducers 108 are held proximate to a surface 110 of a magnetic recording medium, e.g., magnetic disk 111, when reading and writing to the medium. When the slider 102 is located over surface 110 of the disk 111, a fly height 112 is maintained between the slider 102 and the surface 110 by a downward force of arm 104. This downward force is counterbalanced by an air cushion that exists between the surface 110 and an air bearing surface 103 of the slider 102 when the disk 111 is rotating.

It may be desirable to maintain a predetermined slider fly height 112 over a normal range of disk rotational speeds during both reading and writing operations to ensure consistent performance. Region 114 encompasses a "close point" of the slider 102, which is generally understood to be the closest point of contact between the slider 102 and the magnetic recording medium surface 110. To account for both static and dynamic variations that may affect slider fly height 112, the slider 102 may be configured such that a region 114 of the slider 102 near the transducers 108 can be configurably adjusted during operation. This is shown in FIG. 1A by a dotted line that represents a change in geometry of the region 114. In this example, the geometry change may be induced, in whole or in part, by an increase or decrease in temperature of the region 114.

The ability to alter shape of the region 114 due to temperature change may be due, e.g., to the region 114 being formed from a different material than other parts of the slider 102. In such a case, changes in temperature causes a deformation in this area 114 due to different thermal expansion properties of the respective materials. Thus, selective application of heat to the slider 102 can be used to finely adjust the effective fly height 112 of the transducers 108, e.g., as measured between the transducers 108 and media surface 110.

To provide this type of control over effective fly height 112, the slider 102 may include (or otherwise be thermally coupled to) a heating element 116. This heating element 116 (e.g., a resistance heater) may be provided with selectable amounts of current by a control circuit 118. The heating element 116 can be mounted at a variety of locations (e.g., near region 114) and in a manner that minimizes its influence on the aerodynamic properties of the slider 102. Other elements of the slider 102 may also provide heat besides or in addition to the heating element 116. For example, a write coil of the read/write transducer 108 may generate sufficient heat to cause configurable deformation of region 114. Also, non-thermal devices (e.g., piezo-electric devices) may also cause some deformation/deflection of the region 114 instead of or in addition to the heating element 116. It will be appreciated that the slider 102 may include two or more independent close point regions 114 and heaters 116, e.g., one region and heater associated with a read sensor and the other region and heater associated with a write transducer.

The slider 102 also includes a resistive temperature sensor 120 located at or proximate to region 114. This sensor 120 has a temperature coefficient of resistance (TCR) that enables high precision measurements of temperature (or temperature change) at the region 114, and is sometimes referred to as a TCR sensor. The TCR sensor 120 is coupled to sensor/control circuitry 122 that communicates with the sensor 120. The control circuitry 122 may at least include analog circuitry 123 for communicating with sensor (e.g., having a biasing circuit for applying a bias signal to sensor 120). The analog circuitry 123 may include, but is not limited to, amplifiers, preamplifiers, filters, current/voltage limiters, etc. The sensor/control circuitry 122 also includes a controller 125, which may include logic circuitry configured to perform the sensing and control functions described herein. Optionally, the slider 102 may include one or more other TCR sensors, as represented by sensor 124, which is also coupled to sensor circuitry 122. The sensor 124 is disposed in a physically separate location from sensor 120, and can be wired separately from sensor 120 or together with sensor 120 (e.g., in series or parallel). Various embodiments are directed to Dual Ended TCR (DETCR) sensors having geometry and electrical connections that enhance both head-to-media and head-asperity contact detection. Implementations of a dual ended TCR wire sensor having improved (e.g., optimized) geometry and electrical connections according to embodiments of the disclosure account for design compromises that harmonize competing objectives of head-to-media contact and head-asperity contact detection.

The TCR sensor 120 on the air bearing surface is biased by sensor circuitry 122, and the response may also be monitored via circuitry 122. For example, the bias may be a constant current applied to the sensor 120, and the response may be the resulting voltage across the sensor 120. This voltage is proportional to resistance of the sensor in accordance with Ohm's Law, and therefore the voltage can be converted to a resistance value. The concepts described herein may also be applicable to other biasing signals and responses, e.g., constant applied voltage that results in current that varies according to sensor resistance.

The response of the sensor 120 may be used to sense contact with the media surface 110 and/or to detect fly height 112 of the slider 102 over the surface 110 during operation.

Some existing contact detection techniques involve applying a DC bias to the sensor 120 and attempting to detect relative changes in resistance as power to the heater 116 is varied. As the close point region 114 comes into contact with the media surface 110, friction may generally cause an increase of the sensor resistance due to an increase in temperature, which can be detected as in a DC resistance signal of the sensor 120. However, DC resistance measurements are subject to noise, and may require a large number of samples before DC resistance can be estimated. This may make the response of the system unacceptably slow. Also, the sensitivity of this technique may significantly depend on the actuation efficiency of the heater 116. This can make it more difficult to consistently set contact threshold over changes in air bearing conditions. For example, a difference in contact response between air bearing designs might purely be from efficiency differences between the heaters.

Another contact detection technique involves measuring RMS power of the sensed resistance (or voltage) readings of the sensor 120. Mechanical and thermal perturbations occur in the region 114 due to slider-to-disk contact, and these perturbations can be detected in the form of a signature (e.g., an increase) in the RMS value of the sensor output. This detection technique puts bounds on how low the clearance between the heat and the disc can be set because of clearance variations generated by the modulation as well as a potential for increased wear. A contact method that reduces the dependence of contact signal or heater efficiency is therefore desirable.

In one example, the heater 116 is actuated by a time varying signal that changes between two levels at a predetermined frequency. In response to this bias, a change in resistance from first to second resistance values in response to the two input levels may be detected. This change in resistance does not depend directly on the heater efficiency. As a result, the resistance changes due to heating variations of heaters are automatically removed. The one or more sensors 120, 124 can be biased at the disclosed strategy, which allows narrow band filters (or lock-in amplifier 126) to be used to remove common mode thermal noise and increase signal-to-noise ratio (SNR). The sensors 120, 124 outputs can be processed in the time domain and/or frequency domain, e.g., via a digital signal processor which can be used to convert time domain measurements to frequency domain information.

Figure 1B:
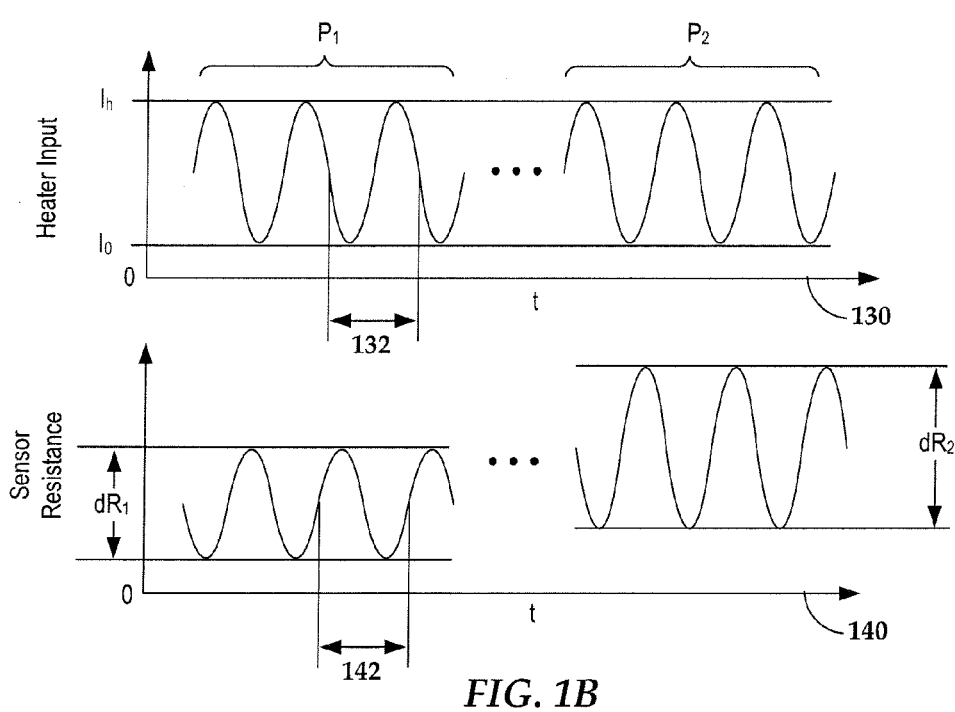
FIG. 1B illustrates an example of applying an AC input signal to heaters and associated response, respectively, of a resistive temperature sensor according to some implementations.

In some embodiments described herein, a modulated heater power may be applied and to measure changes in resistance in sensor 120 resulting from thermal environment changes. For purposes of this disclosure, this applied heater power may be referred to as an alternating current (AC) input, as the input current alternates at least in magnitude over time, and optionally in direction. The AC current modulation parameters may be constant, e.g., having the same minimum value, maximum value, frequency, shape, etc., over time. In FIG. 1B, graphs 130, 140 show an example of an AC bias signal and associated response, respectively, of a resistive temperature sensor according to an example embodiment.

Graph 130 is a plot of applied bias current versus time. The current varies between two values, $I_0$ and $I_h$. In this example, the current varies sinusoidally, although other waveform shapes are possible (e.g., square wave, sawtooth). The current waveform maintains the values of $I_0$ and $I_h$ over time, so that the extremum (or any other value measured at the same time over successive periods) remains constant over time, even though the current itself is varying sinusoidally. Note that in this example, $I_0$ is positive, and so the current does not change direction as is sometimes associated with AC waveforms. Thus the signal in this embodiment may be considered a modulated DC signal with positive values of $I_0$ and $I_h$. In other embodiments, the value of one or both of $I_0$ and $I_h$ may be negative, in which case $I_0$ may be considered a first extremum with the lowest magnitude, and $I_h$ may be considered a second extremum of highest magnitude.

Two time periods applicable to both graphs 130, 140 are annotated in FIG. 1B as $P_1$ and $P_2$. This refers to periods where two different power levels are applied to a heater (e.g., heater 116 in FIG. 1A) that is used to adjust clearance between a slider and media (e.g., fly height 112 in FIG. 1A). This change in heater power will result in a change in local temperature at the sensor 120, which results in a variation of resistance as seen in graph 140. When $P_1$ is applied, the difference between the minimum and maximum resistance is $dR_1$. When $P_2$ is applied the difference between the minimum and maximum resistance is $dR_2$. As will be explained below, the magnitude of $dR_1$ is different than $dR_2$, and these differences can be continuously tracked to determine head-to-disk contact, as well as active clearance between the head-to-disk (e.g., fly height 112).

It should be noted that the waveforms in graphs 130 and 140 are at substantially the same frequency (indicated inferentially by wavelengths 132, 142), this frequency being applied to the heater 160 from control circuitry 118. The output of the sensor 120 in graph 140 can be examined only at this frequency 142, thereby reducing the effects of noise on the measurement. For example, the sensor circuitry 122 may utilize a lock-in amplifier 126 (also known as a phase-sensitive detector) that is tuned for the same frequency 132 that is applied to the sensor 120.

The example shown in FIG. 1B is just one way of measuring the time-varying resistance of a sensor 120. The changes in heat transfer at or near contact may also be determined, for example, by applying different first and second bias levels to sensors 120, 124, respectively, measuring two separate resistance measurements from sensors 120, 124, and taking the difference to determine contact and/or clearance. The first and second bias levels may have AC components. The AC components facilitate analyzing resistance in the frequency domain, thereby reducing the effects of noise.

Figure 2:
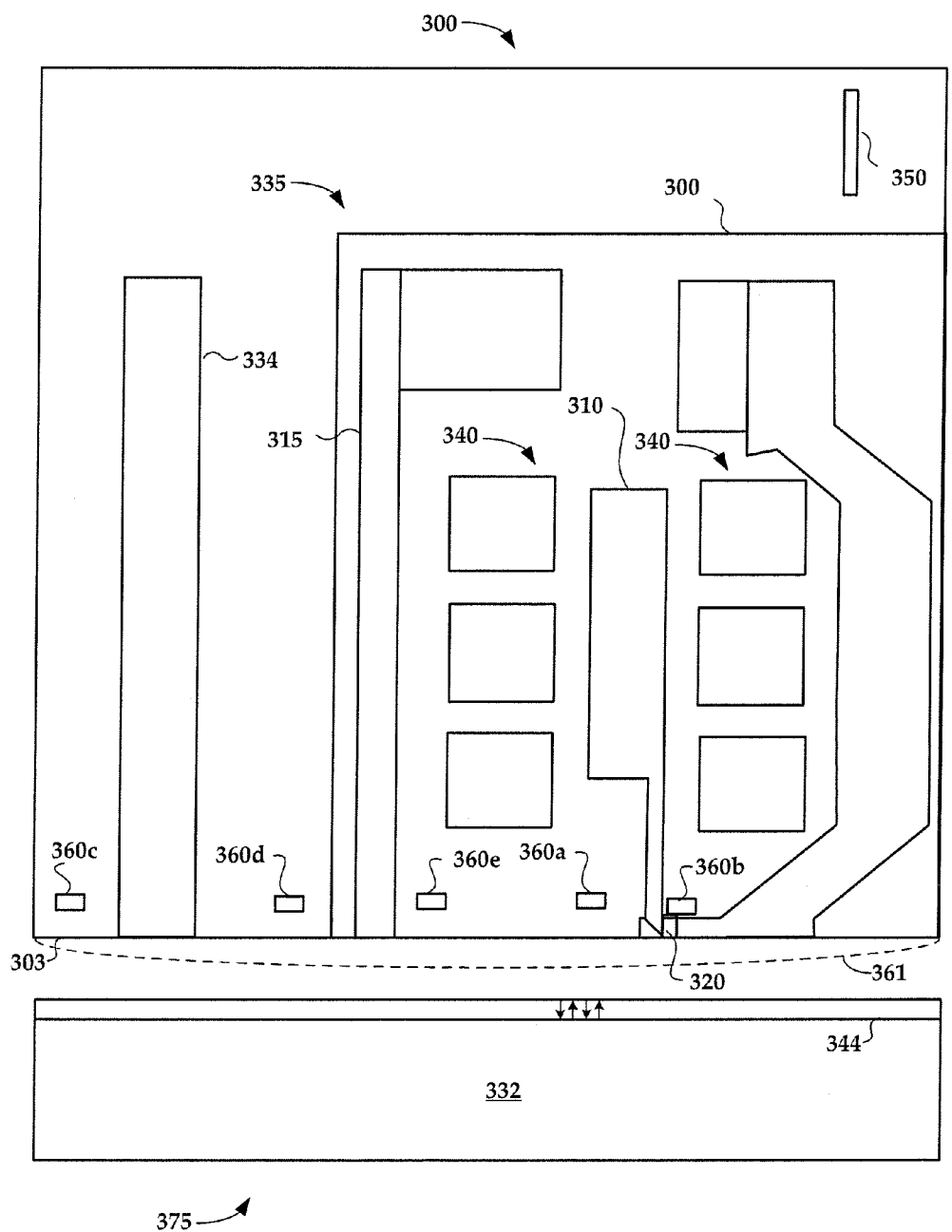
FIG. 2 shows a cross-section of a head transducer 300 in accordance with various embodiments.

The use of an AC heater input also does not require sensitive measurements of DC resistance of TCR sensors in response contact detection level, but instead looks at the response to bias changes. Note that this technique does not depend on contact modulation in the head-to-media interface to create a contact signature, but uses changes in thermal conductivity. As a result, these measurements may also be used to determine clearance out of contact by monitoring thermal conductivity changes before contact is observed A representative embodiment of a portion of a head transducer (also known as a slider) that incorporates a thermal sensor at a protrusion region of the transducer is shown in FIG. 2. FIG. 2 shows a cross-section of a head transducer 300 in accordance with various embodiments. The portion of head transducer 300 illustrated in FIG. 3 includes two heat sources; a write coil 340, and a heater 350, that cause a thermal protrusion, indicated by dashed line 361.

One or more thermal sensors, e.g., TCR sensors, can be located within a protrusion region at one or more optional locations, as shown in FIG. 2. FIG. 2 shows optional thermal sensors 360a, 360b, 360c located at different locations within the region of protrusion 361 inside the writer components. In many embodiments, only one thermal sensor is used. In some embodiments, as illustrated by thermal sensor 360a, a thermal sensor is located in the region of the writer 335, near the write pole 310 and return pole 315. In one configuration, at least a portion of thermal sensor 360a is co-extensive with a portion of the return pole 315 along an axis normal to the air bearing surface. Thermal sensor 360a is situated in an uptrack/downtrack direction from write pole 310. In some configurations, a thermal sensor is located outside the region of the writer 335. For example, thermal sensor 360b is located at a second optional location within the protrusion region of the air bearing surface and adjacent the write pole 310 (but outside of the writer components) on a side of the writer 335 opposite the reader 334. Thermal sensor 360b is located between write pole 310 and heater 350. Thermal sensors 360c, 360d, and 360e illustrate a other optional locations within the protrusion region of the air bearing surface and adjacent the return write pole 315 (but outside of the writer components) between the writer 335 and the reader 334.

It is understood that thermal sensor can be located elsewhere relative to write pole 310 yet still be located within a protrusion region of these components. For example, a thermal sensor can be located between write pole 310 and a coil 340 that energizes the write pole 310.

According to some embodiments, a protrusion region can be a region of the air bearing surface 303 between the write pole 310 and a write return pole 315; between a write return pole 315 and write pole 310, and/or between write return pole 315 and heater 350. In other embodiments, a protrusion region can be considered a region of ABS 303 originating at a heat source, such write pole 310, and/or heater and extending generally outwardly from about 1-3 micrometers around the heat generating element(s). In FIG. 2, the ABS protrusion is indicated by dashed line 361, and the location of maximum ABS protrusion can occur at or between NFT 320 and write pole 310, for example. The protrusion region can be considered a region of ABS 303 extending outwardly from a location of maximum protrusion to locations that expand by at least a predetermined percentage of maximum ABS protrusion e.g., 70%, 80%, 90% or 95%. In some embodiments, the protrusion region is defined by a region of ABS 303 that protrudes at least 80% relative to a region of maximum protrusion of ABS 303. In other embodiments, the protrusion region is defined by a region of ABS 303 that protrudes at least 90% relative to a region of maximum protrusion of ABS 303.

The head transducer 300 may comprise a relatively thick substrate on which is disposed the multiplicity of thin layers. The layers cooperate to define the respective components of the head transducer 300. The layers include a multiplicity of layers tailored to form, for example, a magnetic writer 335 and a magnetic reader 334. The layers may also be patterned to form coils 340 which, when energized with an electrical current, produce a magnetic field passes through the writer 335 and through a portion of the writeable medium 375. One end or terminus 310 (referred to as a write pole) of the writer 335 may be configured to produce a high flux density of the magnetic field. Another end or terminus 315 (referred to as a return pole) of the writer 335, coupled to the write pole 310 via a yoke of the writer, may be configured to produce a lower flux density. The layers of the head transducer 300 also layers tailored to form the thermal sensor shown in FIG. 2 at optional locations as sensor 360a, 360b, 360c.

The writeable medium 375 may be configured in any known way, but typically it includes a plate or substrate 332 on which at least a hard magnetic layer 344 is deposited or otherwise formed. The magnetic field from the magnetic write pole 310 changes the magnetization direction of the recording layer 344, e.g., in a perpendicular direction. Bits of information may then be recorded in the form of a perpendicular upward downward magnetization direction for a series of magnetic domains in the layer 344.

The arrangement shown in FIG. 2 may be extended to include other components (not shown) that heat the media as it is being recorded. Such an arrangement, referred to as heat-assisted magnetic recording (HAMR), may include a high magnetic coercivity material in the recording layer 344 that resists paramagnetic affects that cause thermally-induced fluctuations of magnetic orientation, which lead to data loss in high-density media. A HAMR device utilizes optical components to heat a spot on the recording layer 344 while it is being recorded, thereby locally lowering magnetic coercivity.

Figure 3:
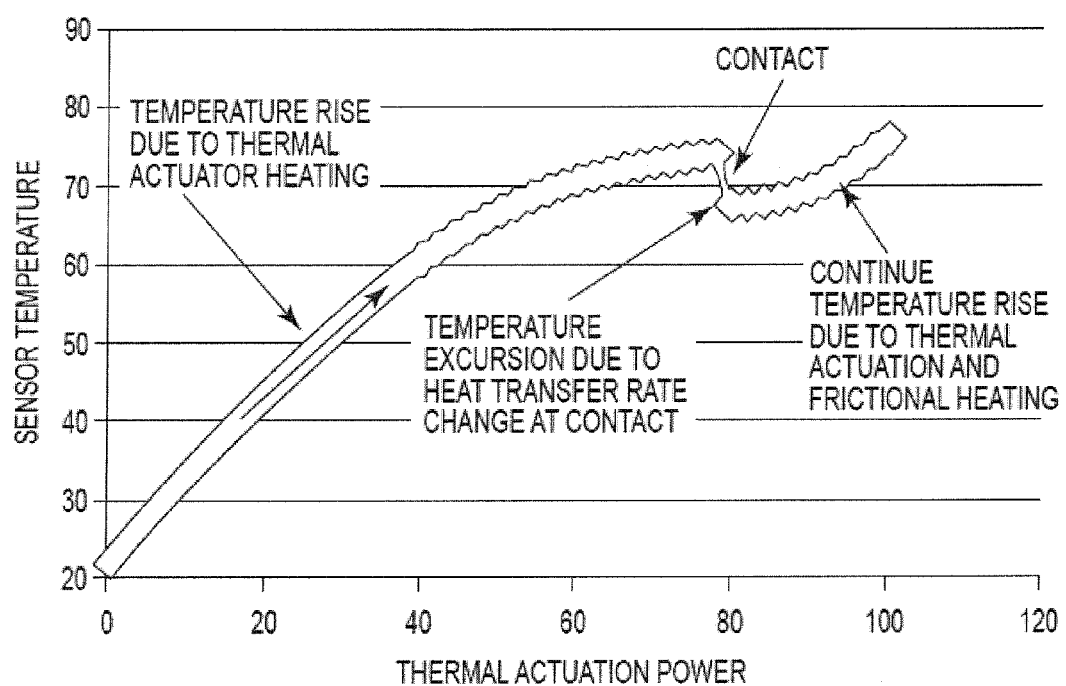
FIG. 3 illustrates a representative temperature profile for a recording head transducer in accordance with various aspects.

FIG. 3 illustrates a representative temperature profile for a recording head transducer 108 of the type shown in FIGS. 1A, 1B and 2 before, during, and after contact between the head transducer 108 and a surface of the magnetic recording disk 110. In this illustrative example, the temperature profile is represented as a steady state DC signal. When the head transducer 108 is actuated by a thermal actuator 116, the head transducer surface temperature will increase with the actuation due to the heat generated by the thermal actuator 116. The head transducer temperature will be higher than the temperature of the disk 110. As such, the disk 110 acts as a heat sink in this scenario.

When the head transducer 108 contacts the disk 110, the head transducer surface temperature will drop due to a change in heat transfer rate resulting from the contact. The head transducer surface temperature will continue to increase due to thermal actuator heating and frictional heating. The change in temperature or excursion in temperature trajectory can be used to declare head-media contact.

According to embodiments described herein, more than one sensor is positioned on the head transducer. As described previously, the sensors may be biased by sensor circuitry. In some cases, the sensors may be biased to operate in more than one mode. For example, the sensors may be biased to operate in a parallel mode, a pseudo series mode, and/or individual channel modes. The circuitry may be able to switch between the bias modes for various applications of the sensors.

Figure 4:
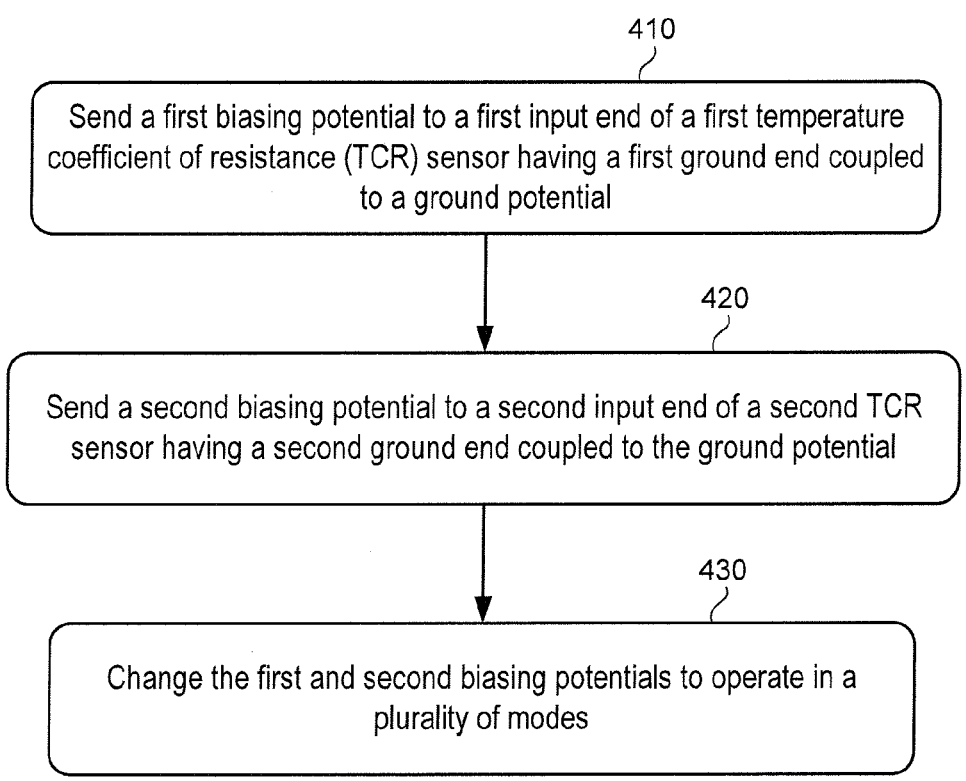
FIG. 4 is a flow diagram that illustrates setting biasing potentials to operate in a plurality of modes in accordance with some embodiments.

FIG. 4 is a flow diagram that illustrates setting biasing potentials to operate in a plurality of modes. A first biasing potential is sent 410 to a first input end of a first temperature coefficient of resistance (TCR) sensor having a first ground end coupled to a ground potential. A second biasing potential is sent 420 to a second input end of a second TCR sensor having a second ground end coupled to the ground potential. The first and second biasing potentials are changed 430 to operate in a plurality of modes. For example, the plurality of modes may include a differential mode in which the first and second biasing potentials have the same polarity, a series mode where the first and second biasing potentials have opposite polarity, and an individual channel mode where one of the first and second biasing potentials are at the ground potential and another of the first and second biasing potentials is at a non-zero potential.

According to various implementations, the first and second biasing potentials are the same magnitude, for example in the range of 10 mV to 1000 mV. For example, the first and second biasing potentials may be about 110 mV. In some cases, the first and the second biasing potentials are different magnitudes. According to various implementations, a failure may be detecting a failure of the first or the second TCR sensor and, in response thereto, using the other sensor as a back-up sensor by setting the failed sensor's first input terminal to zero and setting the back-up sensor's first input terminal to a non-zero biasing potential. According to various embodiments, a first sensor is designated for monitor the power of a laser for HAMR and the second sensors configured to detect contact and/or thermal asperities. The individual channel mode can be used to set the function for each of the sensors.

Figure 5:
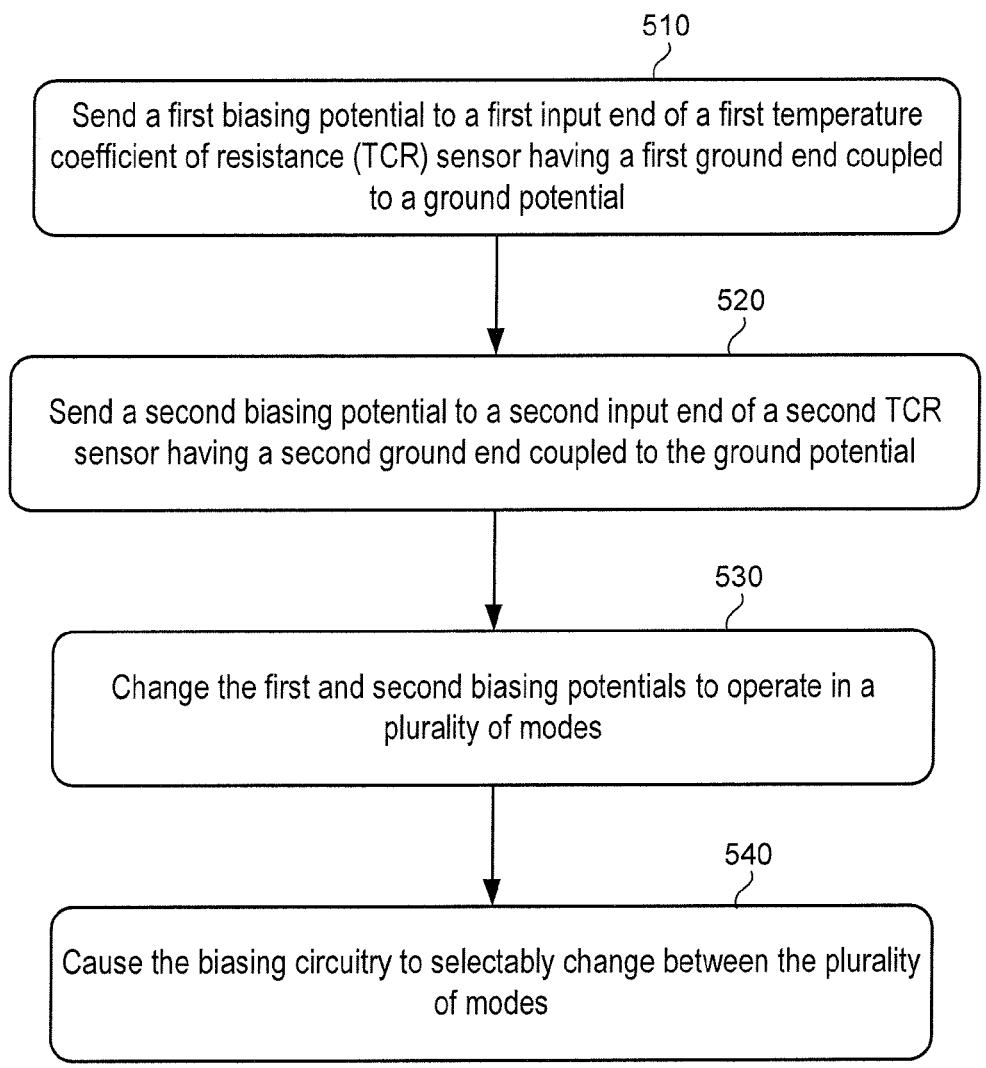
FIG. 5 is a flow diagram in accordance with embodiments described herein.

FIG. 5 is a flow diagram in accordance with embodiments described herein. FIG. 5 includes all of the steps of FIG. 4 and further includes causing 540 the biasing circuitry to selectably change between the plurality of modes. The system may change between the different modes to gather information in different applications. For example, a contact detection application may experience more sensitive results with a particular biasing strategy. Additionally or alternatively, the system may change between the plurality of modes to reduce common mode noise, for example. In some cases, embodiments described herein may be useful for switching between a thermal asperities detection mode, a contact detection mode, and a laser power monitor mode.

Figure 6A:
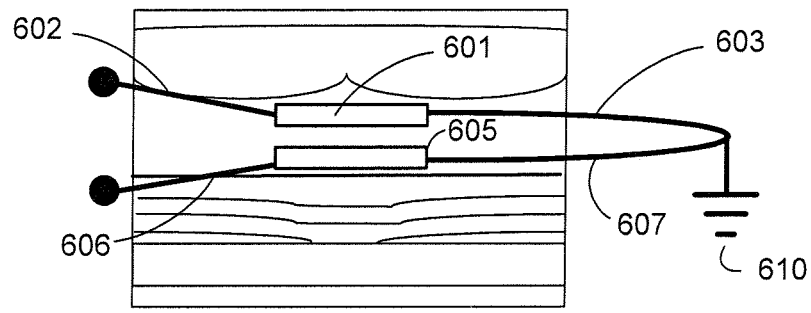
FIGS. 6A-6D show four different biasing strategies for the TCR sensors according to various implementations.

FIGS. 6A-6D show four different biasing strategies for the TCR sensors. In FIG. 6A, two sensors 601, 605 are shown in parallel. First sensor 601 and second sensor 605 have first respective inputs 602, 606 that are at a biasing potential with the same polarity and the same magnitude, e.g. about 110 mV. In some cases, the biasing potential applied to the first input 602 of sensor 601 may be different than the biasing potential applied to the first input 606 of sensor 2 605. The second respective inputs 603, 607 for sensor 601 and sensor 605 are coupled to ground 610.

Figure 6B:
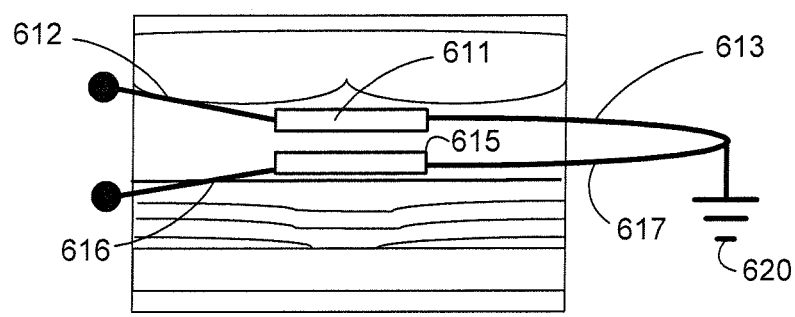

FIG. 6B shows illustrates another biasing configuration. First sensor 611 and second sensor 615 each have a first respective input 612, 616 coupled to a biasing potential. According to various implementations, the biasing potentials applied to the first inputs 612, 616 of sensor 610 and sensor 615 are of opposite polarity. For example, first sensor 612 may be biased at a positive voltage and second sensor 615 may be biased at a negative voltage or vice versa. The magnitude of the bias voltage for both sensor 610 and sensor 615 may be different or the same. The second respective inputs 613, 617 of sensor 610 and sensor 615 are coupled to ground 620.

Figure 6C:
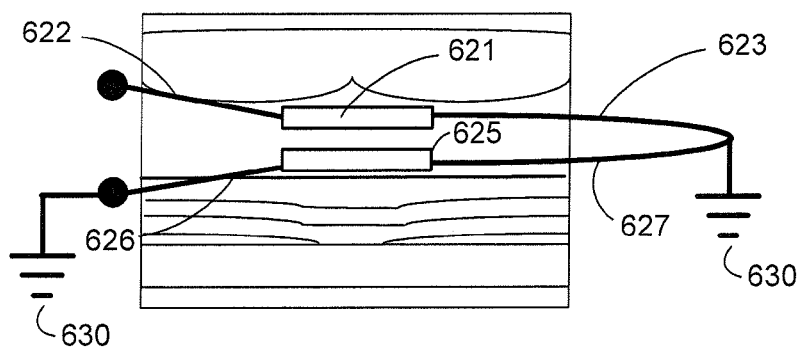
Figure 6D:
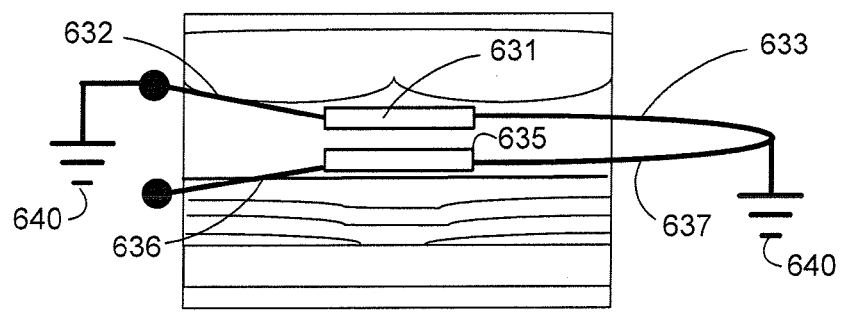

FIGS. 6C and 6D illustrate a biasing configuration that allows use of one of the first sensor and second sensor without the other. FIG. 6C shows an individual channel configuration in which first sensor 621 has a first input 622 coupled to a biasing voltage and a second input 623 coupled to ground 630. Second sensor 625 is not being used in this configuration so both the first input 626 and the second input 627 are coupled to ground 630. FIG. 6D shows an individual channel configuration in which second sensor 635 has a first input 636 coupled to a biasing voltage and a second input 637 coupled to ground 640. First sensor 631 is not being used in this configuration so both the first input 632 and the second input 633 are coupled to ground 640. In some cases, the ground 610, 620, 630, 640 can be connected to a bond pad to apply a non-zero potential to the first sensor 631 and the second sensor 635.

The configuration of the sensors shown in FIGS. 6A-6D facilitates using the TCR sensors for different functions. For example, the first TCR sensor may be designated for thermal asperity detection and the second TCR sensor may be designated for touchdown detection. In such a case the individual channel mode can be selectably turned on for each function. A controller (e.g., controller 125 shown in FIG. 1) can statically or dynamically control the configuration of the TCR sensors, for example changing a configuration in response to a current condition of use. These changes can be applied via analog circuitry (e.g., circuitry 123 in FIG. 1).

EXAMPLES

Figure 7:
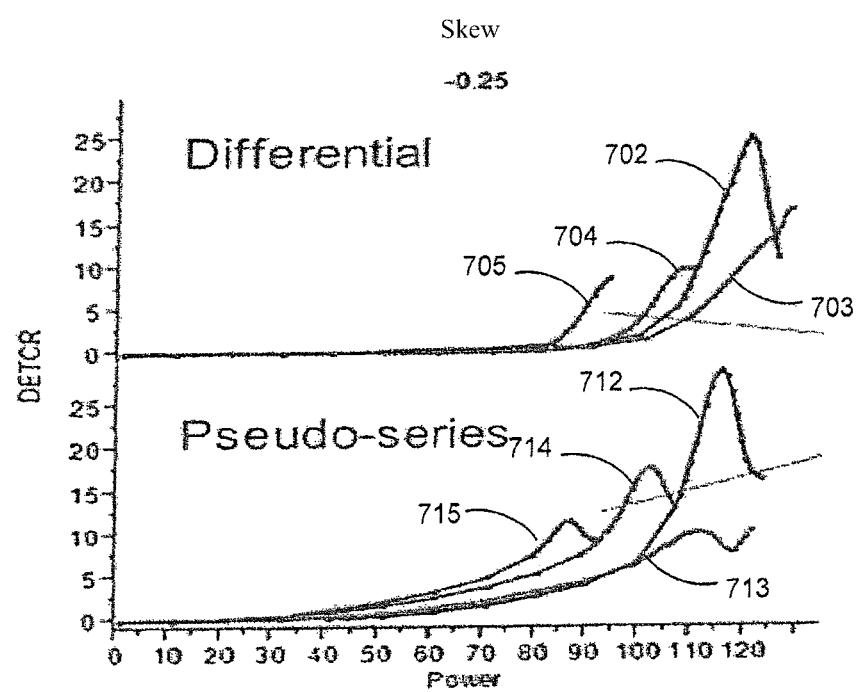
FIG. 7 shows a graph that illustrates a response of TCR sensors that are biased using a differential method and TCR sensors that are biased using a pseudo-series method according to some aspects.

FIG. 7 shows a graph that illustrates a response of TCR sensors that are biased using a differential method and TCR sensors that are biased using a pseudo-series method. Curves 702-705 represent TCR sensor output as a function of heater power for reader heater, writer heater, writer heater and writer coil, and laser turning on, for sensors connected in a differential mode. Curves 712-715 represent TCR sensor output as a function of heater power for reader heater, writer heater, writer heater and writer coil, and laser turning on for sensors connected in a pseudo-series mode. The differential mode resulted in showed sharper uptake of TCR RMS at curve 705 than individual channel mode and the pseudo-series mode (curve 715). The common mode thermal activities may be successfully alleviated or cancelled in the differential mode. The pseudo-series mode showed rollover shapes of RMS responses that can also be useful as contact signatures. In some cases, the differential biasing mode may be used for common mode noise reduction and the pseudo-series mode may be used for contact detection.

Figure 8:
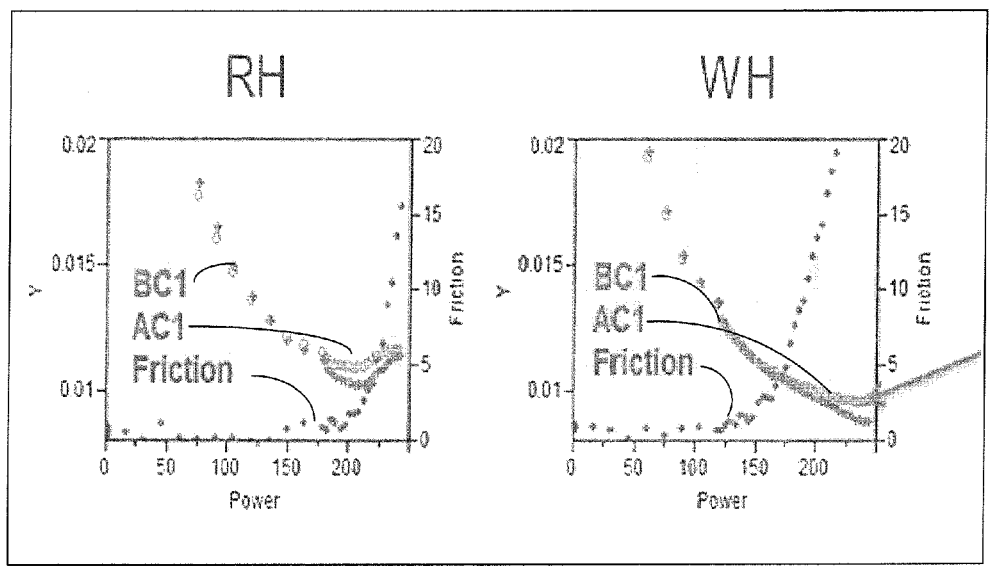
FIG. 8 shows low frequency heater measurements of individual TCR sensors in accordance with various embodiments.

According to various implementations, a ground line introduction may result in increased noise level in the baseline signal. This noise may be reduced by using individual channels using low-frequency AC heaters. A lock in technique for the low frequency heaters may help to reduce and/or eliminate the noise introduced in the ground line. FIG. 8 shows low frequency heater measurements of individual DETCRs and benchmarked to friction. A DETCR sensor BC1 placed near close point shows improved SNR over the other sensor AC1 further away for touchdowns actuated by reader heater (RH) while the sensor AC1 shows improved SNR over the sensor BC1 for touchdowns actuated by writer heater (WH). Individual channel bias can also be applied and tuned on each DETCR to further improve the touchdown detection by leveraging the optimized location of the TCR sensor to close point.

Figure 9:
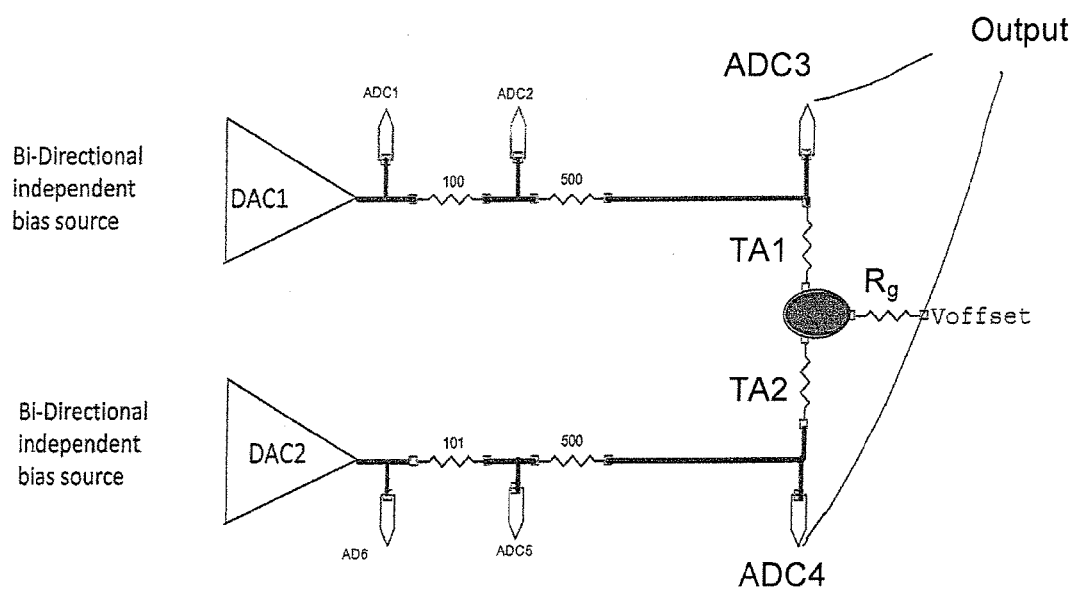
FIG. 9 shows a sensor resistance measuring circuit according to some implementations.

FIG. 9 is a resistance measurement circuit diagram for multiple sensors in accordance with embodiments described herein. DAC1 and DAC2 are swept to get symmetric current ($I_{symmetric}$) between the first sensor TA1 and the second sensor TA2. The potentials of DAC1 and DAC2 will increase until $I_{symmetric}$ reaches the target current. $R_{total}$ is determined by using Equation [1] below.

$$R_{total} = \frac{ADC3 - ADC4}{I_{symmetric}} \quad \text{Equation [1]}$$

The component resistances of the first sensor and the second sensor can be determined by using Equations [2] and [3], respectively where $R_{total}$ RTA1+RTA2.

$$RTA1 = \frac{ADC3 - V_{offset}}{I_{symmetric}} \quad \text{Equation [2]}$$

$$RTA2 = \frac{ADC4 - V_{offset}}{I_{symmetric}} \quad \text{Equation [3]}$$

Positive current can be applied to both sides of the sensors TA1 and TA2 to calculate rg, which is the resistance of the wiring and any parasitic resistance The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to in data storage devices as described above.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. A method, comprising:
   sending a first biasing potential to a first input end of a first temperature coefficient of resistance (TCR) sensor having a first ground end coupled to a ground potential; and
   sending a second biasing potential to a second input end of a second TCR sensor having a second ground end coupled to the ground potential;
   changing the first and second biasing potentials to operate in a plurality of modes, the plurality of modes comprising a differential mode wherein the first and second biasing potentials have the same polarity and a series mode wherein the first and second biasing potentials have opposite polarity.

2. The method of claim 1, further comprising tuning the first and second biasing potentials to improve cancellation of common mode noise from the first and second TCR sensors.

3. The method of claim 1, wherein the first and second biasing potentials have the same biasing potential in the differential mode.

4. The method of claim 1, wherein the plurality of modes comprise an individual channel mode such that first biasing potential comprises a non-zero biasing potential and the second biasing potential comprises the ground potential.

5. The method of claim 4, further comprising detecting a failure of the first TCR sensor and, in response thereto, setting the second biasing potential to the non-zero biasing potential and the first biasing potential comprises the ground potential.

6. The method of claim 4, wherein the first TCR sensor is closer to a recording medium than the second TCR sensor, and wherein the individual channel mode improves a signal to noise ratio of a temperature signal produced by the first sensor.

7. The method of claim 1, further comprising causing the biasing circuitry to selectably change between the plurality of modes by changing the polarity of at least one of the first and second biasing potentials.

8. An apparatus, comprising:
   a head transducer that interacts with a recording medium, the head transducer comprising:

a first temperature coefficient of resistance (TCR) sensor having a first input end and a first ground end coupled to a ground potential; and a second TCR sensor having a second input end and a second ground end coupled to the ground potential; and biasing circuitry coupled to the first and second input ends and configured to:

apply first and second biasing potentials to the first and second input ends, and bias the first and second TCR sensors to operate in a plurality of modes, the plurality of modes comprising a differential mode wherein the first and second biasing potentials have the same polarity and a series mode wherein the first and second biasing potentials have opposite polarity.

9. The apparatus of claim 8, wherein the first TCR is configured to sense thermal asperities and the second TCR sensor is configured to sense contact of a magnetic recording medium.

10. The apparatus of claim 8, wherein the first TCR sensor is configured to monitor laser power for heat assistant magnetic recording (HAMR) and the second TCR sensor is configured to sense at least one of contact and thermal asperities of the recording medium.

11. The apparatus of claim 8, wherein the plurality of modes comprise an individual channel mode such that the biasing circuitry applies a non-zero biasing potential to the first input end and the ground potential to the second input end.

12. The apparatus of claim 11, wherein the biasing circuitry is configured to detect a failure of the first TCR sensor and, in response thereto, apply the non-zero biasing potential to the second input end and the ground potential to the first input end.

13. The apparatus of claim 11, wherein the first TCR sensor is closer to the recording medium than the second TCR sensor, and wherein the individual channel mode improves a signal to noise ratio of a temperature signal produced by the first sensor.

14. The apparatus of claim 8, further comprising mode selection circuitry that causes the biasing circuitry to selectably change between the plurality of modes by changing the polarity of at least one of the first and second biasing potentials.

15. A memory system, comprising:
a disk drive, comprising:
a head transducer that interacts with a recording medium, the head transducer comprising:
a first temperature coefficient of resistance (TCR) sensor having a first input end and a first ground end coupled to a ground potential; and
a second TCR sensor having a second input end and a second ground end coupled to the ground potential; and
biasing circuitry coupled to the first and second input ends and configured to bias the first and second TCR sensors to operate in a plurality of modes, the plurality of modes comprising a differential mode wherein the first and second biasing potentials have the same polarity and a series mode wherein the first and second biasing potentials have opposite polarity.

* * * * *